United States Patent
Gaman et al.

(10) Patent No.: US 6,316,125 B1
(45) Date of Patent: Nov. 13, 2001

(54) ALUMINUM WELDING PROCESS AND COMPOSITION FOR USE IN SAME

(75) Inventors: Nicolae Gaman, Nuenen; Harrie van den Nieuwelaar, Gilze, both of (NL)

(73) Assignee: Erico International Corporation, Solon, OH (US)

( * ) Notice: Subject to any disclaimer, the term of this patent is extended or adjusted under 35 U.S.C. 154(b) by 0 days.

(21) Appl. No.: 09/283,939

(22) Filed: Apr. 1, 1999

Related U.S. Application Data

(60) Provisional application No. 60/080,558, filed on Apr. 3, 1998.

(51) Int. Cl.$^7$ ............................. B32B 15/01; C22C 1/05; C22C 21/14; B23K 31/02; B23K 35/34

(52) U.S. Cl. ............................. 428/654; 75/305; 75/309; 75/315; 75/327; 75/328; 75/329; 75/253; 75/959; 148/523; 148/528; 148/535; 148/23; 148/24; 149/37; 149/40; 164/473; 164/483; 164/488; 164/53; 164/DIG. 12; 228/198; 228/201; 228/212; 228/215; 228/234.3; 228/257; 228/37; 228/56.1; 420/537; 420/548

(58) Field of Search ............................. 428/654; 228/198, 228/201, 212, 215, 234.3, 257, 37, 56.1; 420/537, 548, 553, 540, 550; 148/523, 528, 535, 23, 24; 106/1.12, 1.13; 149/37, 40; 75/305, 309, 315, 327, 328, 329, 253, 959; 164/473, 483, 488, 53, DIG. 12

(56) References Cited

U.S. PATENT DOCUMENTS

| | | | |
|---|---|---|---|
| 2,229,045 | * | 1/1941 | Cadwell .................................. 75/959 |
| 2,280,178 | * | 4/1942 | Stroup .................................. 420/548 |
| 2,569,956 | * | 10/1951 | Schiltknecht ....................... 228/234.3 |
| 2,831,760 | | 4/1958 | Rejdak . |
| 3,020,610 | * | 2/1962 | Rejdak .................................... 75/959 |
| 5,062,903 | * | 11/1991 | Brosnan et al. ......................... 75/959 |
| 5,171,378 | * | 12/1992 | Kovarik et al. ......................... 75/959 |
| 5,490,888 | * | 2/1996 | Assel et al. ............................. 149/37 |

FOREIGN PATENT DOCUMENTS

| | | |
|---|---|---|
| 0 539 670 A2 | 8/1992 | (EP) . |
| 0 539 670 A3 | 8/1992 | (EP) . |
| 0 661 129 A2 | 12/1994 | (EP) . |
| 0 661 129 A3 | 12/1994 | (EP) . |

\* cited by examiner

*Primary Examiner*—Robert R. Koehler
(74) *Attorney, Agent, or Firm*—Renner, Otto, Boisselle & Sklar, LLP

(57) ABSTRACT

The invention provides a new and improved process and exothermic reaction mixture for producing molten weld metal. The molten weld metal is used in joining one metallic piece with at least one other metallic piece. The process and exothermic reaction mixture have distinct advantages over the prior art. These advantages include a higher filler metal yield, an increased tensile strength, and a higher quality corrosion resistant weld. These advantages are accomplished by a process wherein a reactant mixture is provided which has a reducing agent, a metallic compound, and at least two filler metals that at least in part do not chemically react with the metallic compound, one of which is aluminum. The metallic compound subsequently forms, with the reducing agent, having a high heat of formation which provides an exothermic reaction with sufficient heat to melt the filler metals. The reactant mixture is exothermically reacted to release heat and melt the filler metals and provide a flow of filler metals from the reactant and product mixture which may be contacted with objects to be welded by the filler metals.

59 Claims, 1 Drawing Sheet

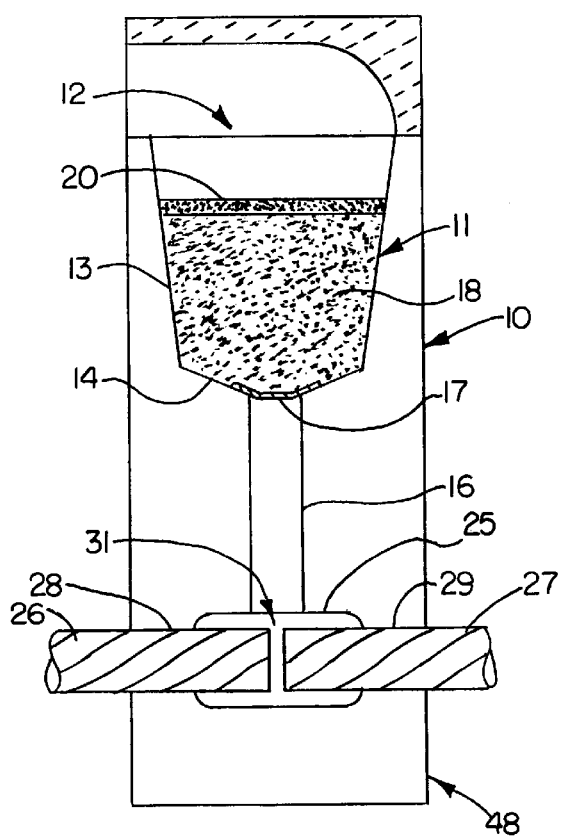
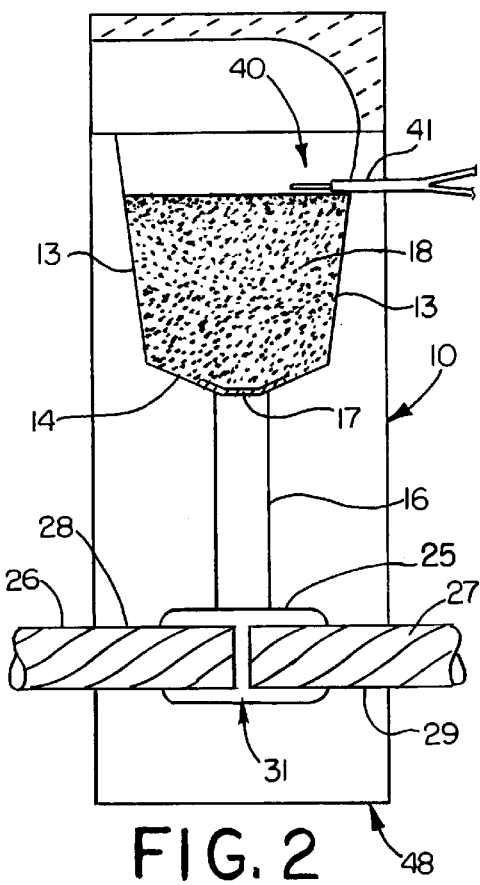
FIG. 1
FIG. 2
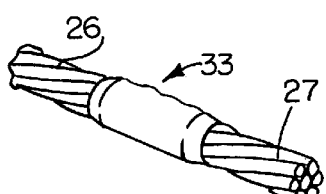
FIG. 3
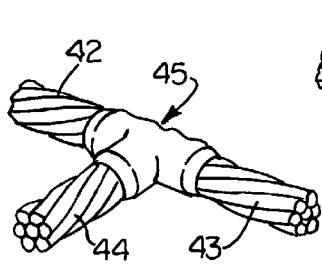
FIG. 4
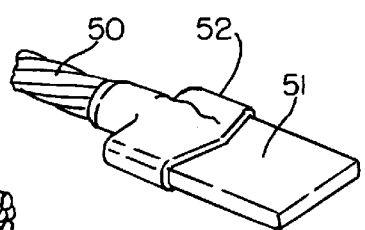
FIG. 5
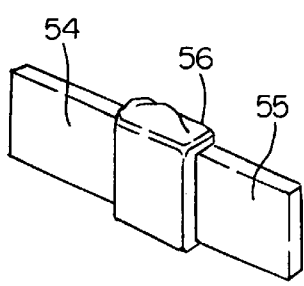
FIG. 6
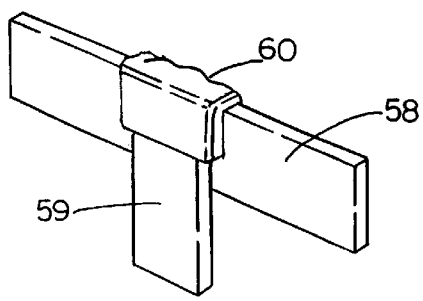
FIG. 7

ALUMINUM WELDING PROCESS AND COMPOSITION FOR USE IN SAME

This application claims the benefit of U.S. Provisional Application No. 60/080,558, filed Apr. 3, 1998.

TECHNICAL FIELD

This invention relates generally to the art of welding. More particularly, the invention concerns an exothermic welding process for welding aluminum, a novel mixture of reactants for use in such process, and weldments resulting from the process.

BACKGROUND OF THE INVENTION

Thermite or aluminothermic reactions have been widely used to make high ampacity low impedance electrical connections. There is no better electrical connection. The connection has a current carrying capacity at least equal to that of the conductors welded. The weld makes a permanent molecular bond with the conductors. The reaction materials are contained in a crucible above a tap hole on a fusible disk. When the materials are ignited, the exothermic reaction produces molten metal and slag. The molten metal fuses the disk and runs through the tap hole to a weld chamber to weld any elements exposed to or projecting into the weld chamber. The materials are ignited at the top of the crucible, and the reaction proceeds downwardly to fuse the disk upon a slight delay after ignition. The slag separates from the molten metal rising to the top of the reaction. Any slag drawn through the tap hole forms on top of the weld in the lower end of the tap hole or a special riser chamber. Any slag adhering to the weld is removed after cooling. The crucible, tap hole and weld chamber may be formed in separable refractory molds which are clamped together around the parts being welded and to form the parts of the process noted. The mold parts are cleaned for reuse after each welding process. The reaction materials, the molds and the weld connections made by the process are sold by Erico International Corporation of Solon, Ohio, USA, under the trademark CADWELD®.

CADWELD® is a registered trademark of ERICO.

The exothermic reaction may be comprised of a reaction between aluminum (Al) and a metal oxide wherein the metal oxide is reduced providing a filler metal, i.e., the source of the filler metal is the oxide on reduction. The "Goldschmidt" reaction is the basis of the application of the process described in U.S. Pat. No. 2,229,045 to Charles A. Caldwell. The reaction is as follows:

Aluminum (Al)+Iron Oxide ($Fe_2O_3$)=heat+Aluminum Oxide ($Al_2O_3$)+Iron (filler metal) (Fe) or Aluminum (Al)+Copper Oxide (CuO)=heat+Aluminum Oxide ($Al_2O_3$)+Copper (filler metal) (Cu)

The "Goldschmidt" reaction has been successfully utilized over the years to weld or join metals such as iron (Fe) and copper (Cu). However, the process is not particularly well adapted for use in joining together a pair of nonferrous metal pieces, such as, two pieces of aluminum (Al) to one another.

U.S. Pat. No. 3,020,610 to Rejdak discloses a method of welding aluminum (Al) and other metals, and provides a listing of various reactions which can be utilized to provide reaction products which may be utilized to provide a weldment. Unfortunately, in the method disclosed by Rejdak the weld which is formed is not suitable for some applications. For example, a weldment produced by the Rejdak method in some environments (such as continuous immersion in rainwater, for example) may be susceptible to a high level of corrosion due to the presence of certain impurities or unwanted elements in the resultant weldment which may adversely affect the life, quality and strength of the weld.

U.S. Pat. No. 2,569,956 to Schiltknecht discloses a process wherein a thermite reaction is utilized to join together a pair of nonferrous metal pieces by melting a sleeve about the metal pieces. This process is usually referred to as the "Alusuisse Process" referring to a welding system produced by Swiss Aluminum Ltd. of Zurich, Switzerland.

U.S. Pat. No. 5,062,903 to Brosnan et al. discloses a process whereby a reducing agent is used to produce heat to melt a filler metal, which then flows out to provide a weldment. Other product components are left behind in the slag with reaction gases released. The process is generally summarized as follows:

Reducing agent+filler metal+metallic compound=heat+weld metal+slag+gases

The Brosnan et al. invention has been used to weld aluminum metal by using aluminum powder as both the reducing agent and filler metal, and calcium sulfate ($CaSO_4$) as the metallic compound. The basic reaction is:

$$Al + CaSO_4 = heat + Al_2O_3 + CaS + Al$$

The weld metal produced by this reaction was essentially pure (99%) aluminum (Al). However, the reactions were not necessarily uniform and stable and weldments sometimes had lower strengths than that of the aluminum pieces to be welded. The solidified weld metal also had excess porosity in some instances. The process lacked uniform repeatability and stability.

U.S. Pat. No. 5,171,378 to Kovarik et al. discloses an invention which improves on the Brosnan et al. process through the addition of silicon (Si) which strengthens the weld metal considerably. The porosity is also reduced through the addition of sodium chloride (NaCl).

U.S. Pat. No. 5,490,888 to Assel et al. discloses an invention which further improves upon both the Kovarik et al. and Brosnan et al. processes through the addition of two or more metallic compounds which are exothermically reduced by a reducing agent, such as calcium sulfate ($CaSO_4$). Assel et al. discloses that the reaction mixture preferably contains at least one metallic compound which is a Group I metal sulfate compound such as $Li_2SO_4$, $Na_2Sl_4$, or $K_2SO_4$.

Among the major drawbacks of the Brosnan et al., Kovarik et al. and Assel et al. processes in welding aluminum is that the welds produced by these processes do not possess a suitably high tensile strength, and in the reaction the slag produced by the processes does not necessarily readily uniformly and repeatedly separate from the weld metal thereby sometimes causing contamination of the weld metal and non-uniform results.

SUMMARY OF THE INVENTION

The present invention provides a new and improved method and exothermic reaction mixture for use in the process for producing molten weld metal. The molten weld metal is used for joining one preferably nonferrous metallic piece with at least one other metallic piece. The method and exothermic reaction mixture have advantages over the prior art, which include a more uniform and improved purity of the metal yield (i.e., improved slag separation), and improved strength and higher quality corrosion resistant weld. An important advantage is consistent repeatability. These advantages are accomplished by a process wherein powdered filler metals of conductive metal are fused in the heat generated by an exothermic reaction mixture to form a molten weld metal, which is primarily an aluminum alloy, thereby welding together the at least two nonferrous metal pieces.

The method is particularly well suited for use in joining one piece of a nonferrous metal such as aluminum (Al) with at least one other piece of a nonferrous metal, which is preferably also aluminum. The reaction mixture for joining the at least two pieces of aluminum may comprise from about 22% to about 27% by weight of a metal sulfate; from about 54% to about 62% by weight aluminum (Al) powder; from about 5.0% to about 6.0% by weight copper (Cu) powder; about 5.3% to about 6.2% by weight of a Group I metal hexafluoroaluminate flux; about 4.7% to about 5.3% by weight of a supplemental oxidizing agent; and about 1.0% to about 1.2% by weight silicon (Si). The supplemental oxidizing agent may be selected from the group consisting of potassium permanganate and sodium chlorate.

Further, the present invention includes a weldment joining at least two pieces of aluminum to one another comprising greater than or equal to about 85 percent by weight aluminum, about 10 percent copper, and the balance of the alloy being primarily manganese (Mn) and silicon (Si).

BRIEF DESCRIPTION OF THE DRAWINGS

FIG. 1 is a view at the parting plane of a mold of one embodiment of a welding apparatus suitable for use in the present invention;

FIG. 2 is a similar view of another embodiment with electrical ignition;

FIG. 3 is a fragmentary perspective of a weld connection as produced by the apparatus of FIGS. 1 or 2;

FIG. 4 is a similar view of a cable Tee connection;

FIG. 5 is a similar view of a cable-bar connection;

FIG. 6 is a similar view of a bus bar connection; and

FIG. 7 is a similar view of a lap Tee bar connection.

DETAILED DESCRIPTION OF THE PREFERRED EMBODIMENTS

A mixture of reactants is provided with a metallic compound which is exothermically reduced by a reducing agent to produce heat to melt two or more filler metals which then flow from the reactant and product mixture to provide a alloy which forms a weldment. Other product components are left behind in a slag with reaction gases released. The process is generally summarized as follows:

Reducing agent+filler metals+metallic compound=heat+ weld metal+slag+gases

In accordance with this invention it has been found with the above reaction that the reducing agent may be selected from the group consisting of aluminum (Al), copper (Cu), or a combination thereof or equivalent metals which exhibit compounds which have a high thermodynamic heat of formation with respect to the reaction product between the metal and the metallic compound to be reduced. Particularly preferred is aluminum (Al) both for its ability to produce a highly exothermic reaction and its relatively low cost. For example, aluminum (Al) can reduce a metal oxide or sulfate forming aluminum oxide ($Al_2O_3$) which exhibits a heat of formation of 399 kcal/mole at 25° C. As stated above, such a reaction is highly exothermic and thereby provides sufficient heat to raise the temperature of the filler metals beyond their melting points so that the molten filler metals can mix to form an alloy while being directed into a weld cavity, i.e., the mold, to affect the weld and join two or more metallic pieces or sections. At least 90 percent by weight of the molten weld metal alloy may be formed by the filler metals.

The metallic compound is generally subject to reduction by the reducing agent and upon reduction contributes one or more elements exothermically to form a compound with the reducing agent. The metallic compound of the present invention is generally a metal compound containing oxygen such as a metal oxide or metal sulfate. The reaction between aluminum and a metal compound which contains oxygen is particularly useful because of the high amount of heat liberated when aluminum oxide ($Al_2O_3$) is formed. The metallic compound used in this invention generally does not, on reduction, provide for a metallic phase which serves as the filler metal or becomes a part of the resultant weld metal. In fact, the metallic compounds of the present invention upon reduction usually form minerals associated with the slag or oxide residual. This is in contrast to the method disclosed in Caldwell U.S. Pat. No. 2,229,045 wherein the metallic compound (i.e., iron oxide ($Fe_2O_3$) provides a metallic phase on reduction to become the filler metal or resultant weld metal (i.e., iron (Fe)).

The metallic compound of the present invention is generally a Group II metal compound. Group II metals, also know as alkaline earth metals, are those contained in Group II of the periodic table of elements. Preferably, the metallic compound is a Group II metal sulfate such as $MgSO_4$, $CaSO_4$, and $BaSO_4$. It is possible however, to utilize other substances in place of a Group II metal sulfate for the metallic compound. For example, the metallic compound could be a Group I metal sulfate. Group I metals, also know as alkali metals, being those metals contained in Group I of the periodic table of elements. If a Group I metal sulfate is used for the metallic compound, the metallic compound it is preferably selected from Group I metal sulfates such as $Li_2SO_4$, $Na_2SI_4$, and $K_2SO_4$.

The filler metals of the present invention comprise at least two metals, that at least in part do not chemically react with the metallic compound, which form an alloy upon heating. Since the present invention is generally concerned with the welding of at least two aluminum pieces together with one another at least one of the filler metals is aluminum. The other filler metal may be selected from either copper (Cu), nickel (Ni), cobalt (Co), manganese (Mn), zinc (Zn) or titanium (Ti). Copper (Cu) is preferred for its ability to conduct electricity and the improved reaction and strength of the weld. Where aluminum welds join one or more sections of aluminum, one of the filler metals and the reducing agent are both aluminum.

The mixture of reactants may additionally include one or more fluxes to lower the melting point of the mixture and products. Commonly utilized fluxes can be used to lower the fusion point and increase the fluidity of the reaction products (i.e. "slag") such that the molten filler metal can readily be separated from the slag and flow into the mold cavity. Proper selection of a flux or a combination of fluxes increase the weld metal yield through greater weld metal-slag separation and reduce hydrogen sulfide odor. Accordingly, it has been determined that fluxes which are aluminate compounds are suitable for this purpose. At least one of the fluxes of the present invention may be a Group I metal aluminate compound such as Group I metal hexafluoroaluminates. Preferably, the fluxes are selected from the group $Li_3AlF_6$ and $K_3AlF_6$.

Through the proper selection of the metallic compound (i.e. sulfates) and flux compounds (aluminates) the weld metal yield can be substantially increased over that of the prior art. This means that less weld material mixture can be used to make the same weld, and a smaller crucible can also be employed. These improvements can result in significant cost savings.

The process of this invention also helps to eliminate segregation in the weld metal caused by limited solubility of constituents such as aluminum (Al) and tin (Sn) as found in the prior art thermite process for welding aluminum conductors. The segregation is reduced because the reactants producing the heat remain in the slag, allowing only the molten aluminum alloy to enter the weld cavity. The process also helps to eliminate the presence of elements which may cause galvanic corrosion thus providing improved longer life connections for power transmission and grounding, both indoors and outdoors. The process also eliminates additional steps or equipment as required with the "Alusuisse Process" or furnaces used in foundry welding operations.

The present invention further includes a weldment which joins one metallic metal piece with at least one other metallic metal piece. The weldment is prepared by the subject process using the exothermic reaction mixture. In one embodiment the ratio of aluminum to copper in the weldment is about 85 to about 10, respectively. Accordingly, in such an embodiment the weldment comprises greater than or equal to 95 percent by weight filler metal alloy, with the remainder being Group I and/or Group II metal, manganese, sulfur and silicon.

When the weldment joins at least two pieces of aluminum (Al) to one another the weldment comprises at least about 80 percent by weight aluminum (Al), at least about 8.5 percent by weight copper (Cu), about 0.06 percent by weight Group I metal and/or about 0.03 percent by weight Group II metal, at most about 3.0 percent by weight manganese (Mn), about 0.006 percent by weight sulfur (S), and at most about 2.3 percent by weight silicon (Si). It should be appreciated that the amount of Group I and/or Group II metal and sulfur (S) is immaterial. More generally, the weldment for joining the at least two pieces of aluminum to one another may include about 80% by weight aluminum, about 8.5% by weight copper, about 3.0% by weight manganese, and about 2.3% by weight silicon. Even more generally, the weldment may include at least about 80% by weight aluminum, at least about 8.5% by weight copper, at most about 3.0% by weight manganese, and at most about 2.3% by weight silicon. In another general formulation, the weldment for joining the at least two pieces of aluminum to one another may include about 80 percent by weight aluminum, and about 8.5 percent by weight copper, with the remainder of the weldment primarily manganese and silicon. Thus, according to an aspect of the invention the alloy may include at least about 80% aluminum and at least about 5% of another conductive metal which improves the physical characteristics of the weld connection. According to another aspect the alloy may include at least about 80% aluminum and at least about 5% of another metal which increases the weight of the metal yield of the exothermic reaction. According to still another aspect, the alloy may include at least about 80% aluminum and at least about 5% of another metal which increases the weight of the metal yield of the exothermic reaction. According to yet another aspect, the alloy may include at least about 80% aluminum and at least about 5% of another metal which improves slag separation.

More preferably the weldment comprises about 84 percent by weight aluminum (Al), about 9.5 percent by weight copper (Cu), about 2.85 percent by weight manganese (Mn), and about 2.15 percent by weight silicon (Si). The remainder of the weldment is immaterial.

Even more preferably the weldment comprises about 83% to about 87% by weight aluminum (Al), about 8.5% to about 11.0% by weight copper (Cu), about 2.50% to about 2.75% by weight manganese (Mn), and about 1.90% to about 2.10% by weight silicon (Si).

The process of this invention is particularly well adapted for use with the welding apparatus formed from two graphite blocks or various other refractory materials as shown in U.S. Pat No. 3,020,610.

Referring now to the annexed drawings, FIG. 1 illustrates a mold block shown generally at 10 which includes a crucible chamber 11 open at the top 12 of the block. The conical wall 13 of the chamber tapers to a conical sloping bottom wall 14 which axially intersects vertical tap hole 16. A fusible disk 17 sits on top of the tap hole and contains an exothermic reaction charge mixture 18. Preferably, fusible disk 17 is aluminum in order to eliminate a possible source of contamination of molten weld metal, and its weight is taken into account. A layer of starting powder 20 may be positioned on top of charge. A hinged lid 22 providing a large lateral vent 24 is positioned on top of the charge before ignition.

The tap hole 16 leads to a weld chamber 26. Two aluminum elements shown as cables 26 and 27 project into the chamber in close fitting sleeving passages 28 and 29, respectively. The shape of the two close fitting sleeves may be selected from the group consisting of circular and polygonal. The aligned facing ends of the cable are slightly spaced in the center of the weld chamber centered under the tap hole as shown at 31.

When the cable ends are in place, the charge in FIG. 1 is ignited with a flint gun, for example. The starting powder ignites and initiates the reaction which moves downwardly from the top. The molten metal formed in the reactions fuses the disk and runs through the tap hole into the weld chamber. By the time the disk fuses, the reaction is normally substantially complete. The molten metal fills the weld chamber fusing the ends of the cables into a solid weld as shown at 33 in FIG. 3. Thus the weldment and the parts to be welded may be contained in a refractory mold. Any separated slag formed is normally on top of the molten metal and drawn into the tap last to solidify in the lower end of the tap hole or a suitable riser chamber if provided. When the weld cools and the mold parts opened, the slag is removed from the top of the weld producing the connection seen in FIG. 3.

FIG. 2 illustrates the same apparatus as shown in FIG. 1, but an electric igniter 40 projects through the wall of the crucible as seen at 41. The igniter is positioned near the top of the charge, or it may be slightly immersed in the charge. When subject to an electrical pulse, the igniter broadcasts sparks or plasma sufficient to cause the exothermic materials to ignite without the use of a starting powder.

In lieu of the lid, one or more special filter assemblies may be used where fumes from the reaction may be absorbed and not enter the surrounding or ambient air.

The apparatus of FIG. 2 also produces the connection of FIG. 3. However, the molds may be shaped to form a wide variety of connections, some of which are shown in FIGS. 4–7.

FIG. 4 illustrates a cable tee connection joining three cables 42, 43 and 44 with a Tee shape weld metal nugget 45. The weld of FIG. 4 may be made, for example, where the lower portion 48 of the mold is separable, and the sleeving passages may be half in both mold parts. When closed, the mold parts are normally clamped together by one or more toggle clamps.

In FIG. 5, there is illustrated a cable 50 joined to a bar 51 by a weld 52. The weld chamber and sleeving passages in the mold are formed to fit the parts and create the weld shown. The bar may be the end of a longer bus bar or a short bar section to form a connecting lug with one or more holes formed in the bar section.

In FIG. 6, two bus bars 54 and 55 are joined end-to-end by the weld metal nugget 56. In FIG. 7, a bus bar 58 is joined to a bus bar 59 by weld nugget 60. The bar 59 forming the stem of the Tee laps the bar 58.

It will be appreciated that many other types and sizes of weld connection can be made both conductor-to-conductor and conductor to other objects such as ground rods or other structures of aluminum or with aluminum coatings.

EXAMPLE 1

A crucible is loaded with a thermite reaction mixture and two 2/O aluminum cables (concentric lay, 7 strands, 50 mm diameter) which are to be joined by the thermite reaction. The cable ends are inserted into the weld chamber. The thermite reaction mixture is then ignited, as described above, in order to form the necessary molten weld metal to produce a weldment. The above process is repeated to yield a total of three weldments. The reactants of the thermite reaction mixture are as follows:

| Constituent | Weight Percent |
| --- | --- |
| $CaSO_4$, Type A | 12.46 |
| $CaSO_4$, Type B | 12.26 |
| Al (powder, AS3) | 38.16 |
| Al (powder, 5039) | 20.0 |
| $Li_3AlF_6$ | 5.66 |
| $KMnO_4$ | 5.0 |
| Cu (powder) | 5.34 |
| Si (powder) | 1.12 |

The three weldments made by this process have a few small voids visible to the naked eye. The cable ends, including the central strands, are all fused to the filler metal. The yield of weld filler metal is 48% for all the welds.

EXAMPLE 2

An additional three weldments (using the same graphite molds and aluminum cables as used in Example 1) are made using the same formula and process as above except that no copper powder is added to the thermite reaction mixture.

The weldments from both examples display the following tensile strengths and break loads as summarized in the table below.

| Properties | Example 1 Formula | Example 2 Formula |
| --- | --- | --- |
| Weld diameter | approx. 50 mm | approx. 50 mm |
| Break Load | 200 kN | 170 kN |
| Tensile Strength | 100 N/mm$^2$ | 85 N/mm$^2$ |

A chemical analysis of the weld nuggets made by the thermite reaction mixture of Example 1 yields the following metal composition (weight percent):

| Element | Amount (%) |
| --- | --- |
| Aluminum (Al) | 85.2% |
| Copper (Cu) | 9.9% |
| Manganese (Mn) | 2.75% |
| Potassium (K) | 0.03% |
| Silicon (Si) | 2.08% |
| Sulfur (S) | 0.004% |
| Lithium (Li) | less than 0.01% |
| Calcium (Ca) | 0.02% |

The process of the present invention is successfully utilized with an alloying element such as silicon (Si) incorporated into the mixture of reactants. In many applications the incorporation of silicon into the mixture can be highly desirable. It has been found that the silicon provides a range of temperatures over which the weld metal will solidify, thus allowing the molten weld metal to feed the solidifying interface. This helps prevent hot cracking and allows gases to escape during solidification, thereby reducing porosity in the weldment. Silicon also has the effect of strengthening the weld metal. The silicon may be provided as elemental silicon or as aluminum-silicon alloy. The benefits of silicon addition are further described in Kovarik et al., U.S. Pat. No. 5,171,378.

EXAMPLE 3

The graphite mold of Example 1 is loaded with a thermite reaction mixture and two ¼"×4" aluminum busbars in a straight splice. The thermite reaction mixture is then ignited, as described above, in order to form the necessary molten weld metal to produce a weldment thereby joining the two busbars. The reactants of the thermite reaction mixture are as follows:

| Constituent | Weight Percent |
| --- | --- |
| $CaSO_4$, Type A | 12.11 |
| $CaSO_4$, Type B | 11.91 |
| Al (powder, AS3) | 38.93 |
| Al (powder, 5039) | 20.4 |
| $Li_3AlF_6$ | 5.50 |
| $KMnO_4$ | 4.86 |
| Cu (powder) | 5.19 |
| Si (powder) | 1.10 |

The above process is repeated to yield a total of three weldments. The weldments made by this process have similar tensile strengths as the weldments produced in accordance with Example 1. A chemical analysis of the weld metal nugget made from the above thermite reaction yields the following metal composition (weight percent):

| Element | Amount (%) |
| --- | --- |
| Aluminum (Al) | 85.71% |
| Copper (Cu) | 9.5% |
| Manganese (Mn) | 2.64% |
| Potassium (K) | 0.03% |
| Silicon (Si) | 2.03% |
| Sulfur (S) | 0.005% |

| Element | Amount (%) |
| --- | --- |
| Lithium (Li) | less than 0.01% |
| Calcium (Ca) | 0.02% |

EXAMPLE 4

Two commercial aluminum cables (using the same graphite mold block as used in Example 1) are welded in a straight splice with the formula from Assel et al., U.S. Pat. No. 5,490,888 Example 6, which is as follows:

| Constituent | Weight Percent |
| --- | --- |
| CaSO$_4$, Type A | 12.0 |
| CaSO$_4$, Type B | 12.0 |
| Na$_2$SO$_4$ | 5.0 |
| Al | 55.8 |
| Si | 5.0 |
| NaF | 5.2 |
| LiF | 4.8 |
| SiO$_2$ | 0.2 |

A tensile strength test on the joined cables and an unannealed cable yields the following results:

| Cable | Tensile Strength |
| --- | --- |
| Unsectioned Annealed Cable | 76.8 N/mm$^2$ |
| Welded Cable #1 | 84.7 N/mm$^2$ |
| Welded Cable #2 | 86.3 N/mm$^2$ |

A chemical analysis of the weld metal nugget made from the above thermite reaction formula yields the following metal composition (weight percent):

| Element | Amount (%) |
| --- | --- |
| Silicon (Si) | 9.67% |
| Sulfur (S) | 0.035% |
| Calcium (Ca) | 0.038% |
| Sodium (Na) | 0.036% |
| Lithium (Li) | 0.049% |
| Aluminum (Al) | Remainder |

EXAMPLE 5

The graphite mold of Example 1 is loaded with a thermite reaction mixture and two 2/0 aluminum cables (concentric lay, 7 strands, 50 mm diameter). The thermite reaction mixture is then ignited, as described above, in order to form the necessary molten weld metal to produce a weldment thereby joining the two cables. The reactants of the thermite reaction mixture are as follows:

| Constituent | Weight Percent |
| --- | --- |
| CaSO$_4$, Type A | 12.83 |
| CaSO$_4$, Type B | 12.63 |
| Al (powder, AS3) | 37.34 |
| Al (powder, 5039) | 19.57 |
| Li$_3$AlF$_6$ | 5.83 |
| KMnO$_4$ | 5.15 |
| Cu (powder) | 5.50 |
| SI (powder) | 1.15 |

The process is repeated to yield a total of three weldments. The weldments made by this process have similar tensile strengths as the weldments produced in accordance with Examples 1 and 3. A chemical analysis of the weld metal nugget made from the above thermite reaction yields the following metal composition (weight percent):

| Element | Amount (%) |
| --- | --- |
| Aluminum (Al) | 84.5% |
| Copper (Cu) | 10.3% |
| Manganese (Mn) | 2.87% |
| Potassium (K) | 0.03% |
| Silicon (Si) | 2.17% |
| Sulfur (S) | 0.004% |
| Lithium (Li) | 0.01% |
| Calcium (Ca) | 0.02% |

EXAMPLE 6

The graphite mold of Example 1 is loaded with a thermite reaction mixture and two 2/0 aluminum cables (concentric lay, 7 strands, 50 mm diameter). The thermite reaction mixture is then ignited, as described above, in order to form the necessary molten weld metal to produce a weldment thereby joining the two cables. The reactants of the thermite reaction mixture are as follows:

| Constituent | Weight Percent |
| --- | --- |
| CaSO$_4$, Type A | 12.67 |
| CaSO$_4$, Type B | 11.98 |
| Al (powder, AS3) | 38.05 |
| Al (powder, 5039) | 19.94 |
| Li$_3$AlF$_6$ | 5.64 |
| KMnO$_4$ | 4.98 |
| Cu (powder) | 5.62 |
| Si (powder) | 1.12 |

The process is repeated to yield a total of three weldments. The weldments made by this process have similar tensile strengths as the weldments produced in accordance with Examples 1, 3 and 5. A chemical analysis of the weld metal nugget made from the above thermite reaction yields the following metal composition (weight percent):

| Element | Amount (%) |
| --- | --- |
| Aluminum (Al) | 84.7% |
| Copper (Cu) | 10.4% |
| Manganese (Mn) | 2.74% |

-continued

| Element | Amount (%) |
| --- | --- |
| Potassium (K) | 0.03% |
| Silicon (Si) | 2.08% |
| Sulfur (S) | 0.004% |
| Lithium (Li) | less than 0.01% |
| Calcium (Ca) | 0.02% |

EXAMPLE 7

The graphite mold of Example 1 is loaded with a thermite reaction mixture and two 2/0 aluminum cables (concentric lay, 7 strands, 50 mm diameter). The thermite reaction mixture is then ignited, as described above, in order to form the necessary molten weld metal to produce a weldment thereby joining the two cables. The reactants of the thermite reaction mixture are as follows:

| Constituent | Weight Percent |
| --- | --- |
| $CaSO_4$, Type A | 12.49 |
| $CaSO_4$, Type B | 12.30 |
| Al (powder, AS3) | 38.27 |
| Al (powder, 5039) | 20.06 |
| $Li_3AlF_6$ | 5.68 |
| $KMnO_4$ | 5.02 |
| Cu (powder) | 5.06 |
| Si (powder) | 1.12 |

The process is repeated to yield a total of three weldments. The weldments made by this process have similar tensile strengths as the weldments produced in accordance with Examples 1, 3, 5 and 6. A chemical analysis of the weld metal nugget made from the above thermite reaction yields the following metal composition (weight percent):

| Element | Amount (%) |
| --- | --- |
| Aluminum (Al) | 85.6% |
| Copper (Cu) | 9.4% |
| Manganese (Mn) | 2.77% |
| Potassium (K) | 0.03% |
| Silicon (Si) | 2.09% |
| Sulfur (S) | 0.004% |
| Lithium (Li) | 0.01% |
| Calcium (Ca) | 0.02% |

The weldments made with Formula 1, 3, 5, 6 and 7 have increased slag separation which results in an increased yield of filler metal as compared with the prior art formulae of Examples 2 and 4. In addition, the weldments made utilizing the present invention's process and reaction mixture formulae possess a higher tensile strength than the weldments produced with prior art formulae or with a formula similar to the present invention's without the addition of copper (Cu) to the reactants. Furthermore, the manganese (Mn) that ends up in the weld metal nugget from the $KMnO_4$ makes the weldment more corrosion resistant.

While the invention has been explained in relation to its preferred embodiments, it is understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for producing a molten weld metal aluminum/copper alloy for use in joining at least two aluminum pieces comprising:
   (A) providing a mixture of reactants comprising a reducing agent, a metallic compound which is exothermically reduced by such reducing agent and filler metals that at least in part do not chemically react with such metallic compound or such reducing agent upon the exothermic reaction of such reducing agent and such metallic compound; and
   (B) exothermically reacting such reducing agent and such metallic compound so as to generate sufficient heat to melt such filler metals and form such molten weld metal alloy for joining such metallic pieces, at least 90 percent by weight of such molten weld metal alloy being formed by such filler metals.

2. A process as set forth in claim 1 wherein the weld metal alloy comprises:
   at least about 80% by weight aluminum;
   at least about 8.5% by weight copper;
   at most about 3.0% by weight manganese; and
   at most about 2.3% by weight silicon,
   with the remainder of the weld metal being immaterial, wherein the physical characteristics of the weld connection are improved.

3. A process as set forth in claim 2 wherein the weld metal alloy comprises:
   about 83% to about 87% by weight aluminum;
   about 8.5% to about 11.0% by weight copper;
   about 2.50% to about 2.75% by weight manganese; and
   about 1.90% to about 2.10% by weight silicon, wherein the physical characteristics of the weld connection are improved.

4. A process as set forth in claim 1 wherein the at least two metallic pieces are joined using a mold block comprising:
   a crucible chamber for holding the mixture of reactants comprising a conical wall which tapers to a conical sloping bottom wall;
   a vertical tap hole having a first end and a second end, wherein the first end axially intersects the conical sloping bottom wall and the second end intersects a weld chamber, wherein the weld chamber has at least two close fitting sleeve openings into which a metallic piece may be inserted; and
   a fusible disk which sits on top of the tap hole.

5. A process as set forth in claim 1, wherein said mixture of reactants includes an aluminate flux and an oxidizer.

6. A process as set forth in claim 4 wherein the fusible disk is an aluminum fusible disk.

7. A process as set forth in claim 4 wherein the shape of the at least two close fitting sleeves is selected from the group consisting of circular and polygonal.

8. A method of forming a weld connection of electrically conductive aluminum elements comprising the steps of forming and containing a molten weld metal to flow into contact with the aluminum elements to be joined, forming the weld metal by a contained exothermic reaction of a mixture of exothermic material, such material including powdered filler metals of conductive metal which are fused in the heat of the reaction to form an aluminum alloy for the weld joining of the aluminum elements, the balance of the reaction separating as slag.

9. A method as set forth in claim 8 wherein the alloy comprises at least about 80% aluminum and at least about 5% of another conductive metal which improves the physical characteristics of the weld connection.

10. A method as set forth in claim 8 wherein the alloy comprises at least about 80% aluminum and at least about 5% of another metal which increases the weight of the metal yield of the exothermic reaction.

11. A method as set forth in claim 8 wherein the alloy comprises at least 80% aluminum and at least about 5% of another metal which improves the slag separation.

12. A method as set forth in claim 8 wherein said filler metals are aluminum and copper.

13. A method as set forth in claim 12 wherein the balance of the alloy includes manganese and silicon.

14. A method as set forth in claim 13 wherein the ratio of aluminum and copper in the alloy is about 85 to about 10.

15. A process as set forth in claim 8 wherein the weld metal comprises:
    at least about 80% by weight aluminum;
    at least about 8.5% by weight copper;
    at most about 3.0% by weight manganese; and
    at most about 2.3% by weight silicon,
    with the remainder of the weld metal being immaterial, wherein the physical characteristics of the weld connection are improved.

16. A process as set forth in claim 8 wherein the weld metal alloy comprises:
    about 83% to about 87% by weight aluminum;
    about 8.5% to about 11.0% by weight copper;
    about 2.50% to about 2.75% by weight manganese; and
    about 1.90% to about 2.10% by weight silicon, wherein the physical characteristics of the weld connection are improved.

17. An exothermic reaction mixture which upon initiation of an exothermic reaction forms a molten weld metal for use in joining at least two nonferrous metal pieces with one another, the exothermic reaction mixture comprising:
    a reducing agent;
    at least two filler metals;
    a metallic compound which is a Group II metal sulfate, which during the exothermic reaction is reduced by the reducing agent and forms a compound with the reducing agent having a heat of formation which provides an exothermic reaction with sufficient heat to melt the at least two filler metals; and
    a supplemental oxidizing agent.

18. An exothermic reaction mixture as set forth in claim 17 wherein said at least two nonferrous metal pieces are aluminum pieces.

19. An exothermic reaction mixture as set forth in claim 17 wherein said reducing agent is selected from the group consisting of aluminum, copper or a combination thereof.

20. An exothermic reaction mixture as set forth in claim 17 wherein said metallic compound is selected from the group consisting of calcium sulfate, magnesium sulfate, and barium sulfate.

21. An exothermic reaction mixture as set forth in claim 17 wherein one of the at least two filler metals is aluminum and the remaining filler metals are selected from the group consisting of copper, nickel, cobalt, zinc, titanium and manganese.

22. An exothermic reaction mixture as set forth in claim 17 further comprising at least one Group I metal hexafluoroaluminate flux.

23. An exothermic reaction mixture which upon initiation of an exothermic reaction forms a molten weld metal for use in joining at least two pieces of aluminum with one another, said mixture of reactants comprising:
    about 54% to about 62% by weight aluminum;
    about 5.0% to about 6.0% by weight copper;
    about 22% to about 27% by weight of a Group II metal sulfate;
    about 5.3% to about 6.2% by weight of a Group I metal hexafluoroaluminate;
    about 4.7% to about 5.3% by weight of a supplemental oxidizing agent; and
    about 1.0% to about 1.2% by weight silicon.

24. An exothermic reaction mixture which upon initiation of an exothermic reaction forms a molten weld metal for use in joining a non-ferrous metal piece with at least one other metal piece, the exothermic reaction mixture comprising:
    a reducing agent;
    at least two filler metals;
    a metallic compound which is calcium sulfate which during the exothermic reaction is reduced by the reducing agent and forms a compound with the reducing agent having a heat of formation which provides an exothermic reaction with sufficient heat to melt the filler metal;
    a supplemental oxidizing agent; and
    at least one hexafluoroaluminate flux selected from the group consisting of lithium hexafluoroaluminate and potassium hexafluoroaluminate.

25. An exothermic reaction mixture which upon initiation of an exothermic reaction forms a molten weld metal for use in joining a non-ferrous metal piece with at least one other metal piece, the exothermic reaction mixture comprising:
    a reducing agent;
    at least two filler metals;
    a metallic compound which is calcium sulfate which during the exothermic reaction is reduced by the reducing agent and forms a compound with the reducing agent having a heat of formation which provides an exothermic reaction with sufficient heat to melt the filler metal;
    a supplemental oxidizing agent selected from the group consisting of potassium permanganate and sodium chlorate; and
    at least one hexafluoroaluminate flux selected from the group consisting of lithium hexafluoroaluminate and potassium hexafluoroaluminate.

26. A weldment for joining at least two pieces of aluminum to one another comprising at least about 80 percent by weight aluminum, at least about 8.5 percent by weight copper, and wherein the remainder of the weldment includes manganese and silicon.

27. A weldment for joining at least two pieces of aluminum to one another as set forth in claim 26 wherein the weldment is produced by an exothermic reaction.

28. A weldment for joining at least two pieces of aluminum to one another as set forth in claim 27 wherein the exothermic reaction, the weldment and the parts to be welded are contained in a refractory mold.

29. A weldment for joining at least two pieces of aluminum to one another as set forth in claim 26 comprising about 80 percent by weight aluminum and about 8.5 percent by weight copper.

30. A weldment for joining at least two pieces of aluminum to one another comprising:
   at least about 80% by weight aluminum;
   at least about 8.5% by weight copper;
   at most about 3.0% by weight manganese; and
   at most about 2.3% by weight silicon,
   with the remainder of the weldment being immaterial, wherein the physical characteristics of the weld connection are improved.

31. A weldment for joining at least two pieces of aluminum to one another as set forth in claim 30 comprising:
   about 80% by weight aluminum;
   about 8.5% by weight copper;
   about 3.0% by weight manganese; and
   about 2.3% by weight silicon,
   with the remainder of the weldment being immaterial, wherein the physical characteristics of the weld connection are improved.

32. A weldment for joining at least two pieces of aluminum to one another comprising:
   about 83% to about 87% by weight aluminum;
   about 8.5% to about 11.0% by weight copper;
   about 2.50% to about 2.75% by weight manganese; and
   about 1.90% to about 2.10% by weight silicon,
wherein the physical characteristics of the weld connection are improved.

33. An exothermic reaction mixture which upon initiation of an exothermic reaction forms a molten weld metal for use in joining at least two nonferrous metal pieces with one another, the exothermic reaction mixture comprising:
   aluminum;
   an additional metal selected from the group consisting of copper, nickel, cobalt, zinc, titanium, and manganese;
   a metallic compound; and
   a flux which includes an aluminate compound;
   wherein the metallic compound is a Group I metal sulfate.

34. An exothermic reaction mixture as set forth in claim 33 wherein the Group I metal sulfate is selected from the group consisting of lithium sulfate, sodium sulfate, and potassium sulfate.

35. An exothermic reaction mixture which upon initiation of an exothermic reaction forms a molten weld metal for use in joining at least two nonferrous metal pieces with one another, the exothermic reaction mixture comprising:
   aluminum;
   an additional metal selected from the group consisting of copper, nickel, cobalt, zinc, titanium, and manganese;
   a metallic compound; and
   a flux which includes an aluminate compound;
   wherein the aluminate compound is a Group I metal hexafluoroaluminate selected from the group consisting of lithium hexafluoroaluminate and potassium hexafluoroaluminate.

36. An exothermic reaction mixture which upon initiation of an exothermic reaction forms a molten weld metal for use in joining at least two nonferrous metal pieces with one another, the exothermic reaction mixture comprising:
   aluminum;
   an additional metal selected from the group consisting of copper, nickel, cobalt, zinc, titanium, and manganese;
   a metallic compound; and
   a flux which includes an aluminate compound; and
   a supplemental oxidizing agent.

37. An exothermic reaction mixture as set forth in claim 36 wherein the oxidizing agent is selected from the group consisting of potassium permanganate and sodium chlorate.

38. An exothermic reaction mixture which upon initiation of an exothermic reaction forms a molten weld metal for use in joining at least two nonferrous metal pieces with one another, the exothermic reaction mixture comprising:
   aluminum;
   an additional metal selected from the group consisting of copper, nickel, cobalt, zinc, titanium, and manganese;
   a metallic compound;
   a flux which includes an aluminate compound; and
   silicon.

39. An exothermic reaction mixture which upon initiation of an exothermic reaction forms a molten weld metal for use in joining at least two nonferrous metal pieces with one another, the exothermic reaction mixture comprising:
   aluminum;
   an additional metal selected from the group consisting of copper, nickel, cobalt, zinc, titanium, and manganese;
   a metallic compound; and
   a supplemental oxidizing agent.

40. An exothermic reaction mixture as set forth in claim 39 wherein the additional metal is copper.

41. An exothermic reaction mixture as set forth in claim 39 wherein the metallic compound is a Group II metal compound.

42. An exothermic reaction mixture as set forth in claim 41 wherein the Group II metal compound is a Group II metal sulfate.

43. An exothermic reaction mixture as set forth in claim 42 wherein the Group II metal sulfate is selected from the group consisting of calcium sulfate, magnesium sulfate, and barium sulfate.

44. An exothermic reaction mixture as set forth in claim 43 wherein the Group II metal sulfate is calcium sulfate.

45. An exothermic reaction mixture as set forth in claim 39 wherein the metallic compound is a metal sulfate.

46. An exothermic reaction mixture as set forth in claim 45 wherein the metal sulfate is a Group I metal sulfate.

47. An exothermic reaction mixture as set forth in claim 46 wherein the Group I metal sulfate is selected from the group consisting of lithium sulfate, sodium sulfate, and potassium sulfate.

48. An exothermic reaction mixture as set forth in claim 39 further comprising a flux.

49. An exothermic reaction mixture as set forth in claim 48 wherein the flux aluminate compound is a Group I metal aluminate compound.

50. An exothermic reaction mixture as set forth in claim 49 wherein the Group I metal aluminate compound is a Group I metal hexafluoroaluminate.

51. An exothermic reaction mixture as set forth in claim 50 wherein the Group I metal hexafluoroaluminate is selected from the group consisting of lithium hexafluoroaluminate and potassium hexafluoroaluminate.

52. An exothermic reaction mixture as set forth in claim 39 wherein the oxidizing agent is selected from the group consisting of potassium permanganate and sodium chlorate.

53. An exothermic reaction mixture as set forth in claim 39 further comprising silicon.

54. An exothermic reaction mixture as set forth in claim 17 wherein the oxidizing agent is selected from the group consisting of potassium permanganate and sodium chlorate.

55. An exothermic reaction mixture as set forth in claim 21 wherein the remaining filler metals includes copper.

56. An exothermic reaction mixture as set forth in claim 22 wherein the Group I metal hexafluoroaluminate flux includes a material selected from the group consisting of lithium hexafluoroaluminate and potassium hexafluoroaluminate.

57. An exothermic reaction mixture as set forth in claim 23 wherein the Group II metal sulfate is selected from the group consisting of calcium sulfate, magnesium sulfate, and barium sulfate.

58. An exothermic reaction mixture as set forth in claim 23 wherein the Group I metal hexafluoroaluminate is selected from the group consisting of lithium hexafluoroaluminate and potassium hexafluoroaluminate.

59. An exothermic reaction mixture as set forth in claim 23 wherein the oxidizing agent is selected from the group consisting of potassium permanganate and sodium chlorate.

\* \* \* \* \*